(12) United States Patent
Gutta et al.

(10) Patent No.: US 6,496,117 B2
(45) Date of Patent: Dec. 17, 2002

(54) SYSTEM FOR MONITORING A DRIVER'S ATTENTION TO DRIVING

(75) Inventors: Srinivas Gutta, Buchanan, NY (US); Miroslav Trajkovic, Ossining, NY (US); Antonio Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/822,224

(22) Filed: Mar. 30, 2001

(65) Prior Publication Data

US 2002/0140562 A1 Oct. 3, 2002

(51) Int. Cl.[7] .............................................. G08B 23/00
(52) U.S. Cl. ....................... 340/576; 340/521; 340/575; 348/77
(58) Field of Search ................................ 340/576, 435, 340/521, 439, 903, 905, 457, 575; 701/45; 348/77, 78; 180/167; 368/109, 250, 263

(56) References Cited

U.S. PATENT DOCUMENTS 5,642,093 A * 6/1997 Kinoshita ................... 340/439
6,049,747 A * 4/2000 Nakajima ................... 340/576
6,154,559 A * 11/2000 Beardsley ................... 340/576

FOREIGN PATENT DOCUMENTS

| DE | 19702748 | 9/1997 | ............ A61B/5/00 |
| EP | 1037189 A2 | 9/2000 | ............ G08G/1/16 |
| WO | WO 00/38949 | 7/2000 | |

* cited by examiner

*Primary Examiner*—Anh V La
(74) *Attorney, Agent, or Firm*—John Vodopia

(57) ABSTRACT

A system for monitoring a driver's attention to driving a vehicle includes a camera having a field of view wherein a driver's face is positioned in the field of view of the camera. The system also includes a gaze and facial pose determiner coupled to the camera which receives signals corresponding to images of the driver's face for analysis. The gaze and facial pose determiner determines whether the gaze and facial pose of the driver are oriented in a forward direction of travel of the vehicle. The system also includes an alarm responsive to the gaze and facial pose determiner for advising the driver that his gaze and facial pose are not oriented in the forward direction of travel of the vehicle.

15 Claims, 2 Drawing Sheets

SYSTEM FOR MONITORING A DRIVER'S ATTENTION TO DRIVING

FIELD OF THE INVENTION

This invention relates to vision systems for vehicles, and more particularly relates to a system which monitors a driver's attention to driving.

BACKGROUND INFORMATION

A major cause of driving accidents is a driver's lack of attention to the task of driving. This includes the driver not monitoring the current road conditions (e.g., weather conditions) and not monitoring other vehicles on the roadway proximate the driver's car. Drivers typically encounter many distractions while driving. Examples of distractions encountered by drivers include viewing scenery, pedestrians, other drivers and vehicles, driver fatigue and sleepiness, adjusting the controls on the stereo, utilizing a cellular phone, looking in the mirror and engaging in conversation with passengers. All of the above distractions divert the driver's attention from driving, and as such cause the driver to lose perspective of the relationship between the driver's vehicle and other vehicles on the roadway.

It would be beneficial to have a system which monitors a driver's attention to driving and advises a driver if the driver has not viewed the driving conditions in front of the driver's vehicle for a period of time.

OBJECTS AND SUMMARY OF THE INVENTION

It is therefore an object of the present invention to provide a system which monitors a driver's attention to driving.

It is another object of the present invention to provide a system which monitors a driver's attention to driving and provides an audible, visual or tactile alarm to advise the driver to redirect his attention to the forward direction of travel.

It is a further object of the present invention to provide a system for monitoring a driver's attention to driving which overcomes inherent disadvantages of known driver monitoring systems.

In accordance with one form of the present invention, a system for monitoring a driver's attention to driving a vehicle includes a driver monitoring camera having a field of view wherein the driver's face is positioned in a field of view of the camera so that the camera can capture images of the driver's gaze and facial pose. The system also includes a gaze and facial pose determiner coupled to the driver monitoring camera which receives image signals from the driver monitoring camera indicative of the driver's face for analysis. The gaze and facial pose determiner provides an indication of whether the driver's gaze and facial pose are oriented in a forward direction of travel of the vehicle. The system also includes an alarm responsive to the gaze and facial pose determiner for advising the driver that his gaze and facial pose are not oriented in the forward direction of travel of the vehicle.

In accordance with another form of the present invention, the system for monitoring a driver's attention to driving a vehicle includes a driver monitoring camera having a field of view wherein the driver's face is positioned in the field of view of the driver monitoring camera so that the camera can capture images of the driver's gaze and facial pose. The system also includes a gaze and facial pose determiner coupled to the driver monitoring camera which receives image signals from the camera indicative of the driver's face for analysis. The gaze and facial pose determiner provides an indication as to whether the gaze and facial pose of the driver are oriented in a forward direction of travel of the vehicle. The system also includes an object monitoring camera having a field of view and being oriented on the vehicle so as to monitor regions external to and proximate the vehicle, and an object distance determiner operatively coupled to the object monitoring camera. The object distance determiner identifies an object which is in the field of view of the object monitoring camera and determines the identified object's distance from the driver's vehicle. The system also includes a speedometer for determining a speed of the vehicle and an alarm. If at least one of the gaze and facial pose of the driver are not oriented in the forward direction of travel of the vehicle, and the object distance determiner identifies an object in the field of view of the camera that is within a predetermined distance from the vehicle, the alarm is actuated to warn the driver of a potential danger, and if at least one of the gaze and facial pose of the driver are not oriented in the forward direction of travel of the vehicle for a predetermined period of time wherein the predetermined period of time is related to the speed of the vehicle, the alarm is actuated to advise the driver to set his gaze and facial pose on the forward direction of travel.

A preferred form of the system for monitoring a driver's attention while driving his vehicle, as well as other embodiments, objects, features and advantages of the invention will be apparent from the following detailed description of illustrative embodiments thereof, which is to be read in connection with the accompanying drawings.

DETAILED DESCRIPTION OF THE PREFERRED EMBODIMENTS

Figure 1:
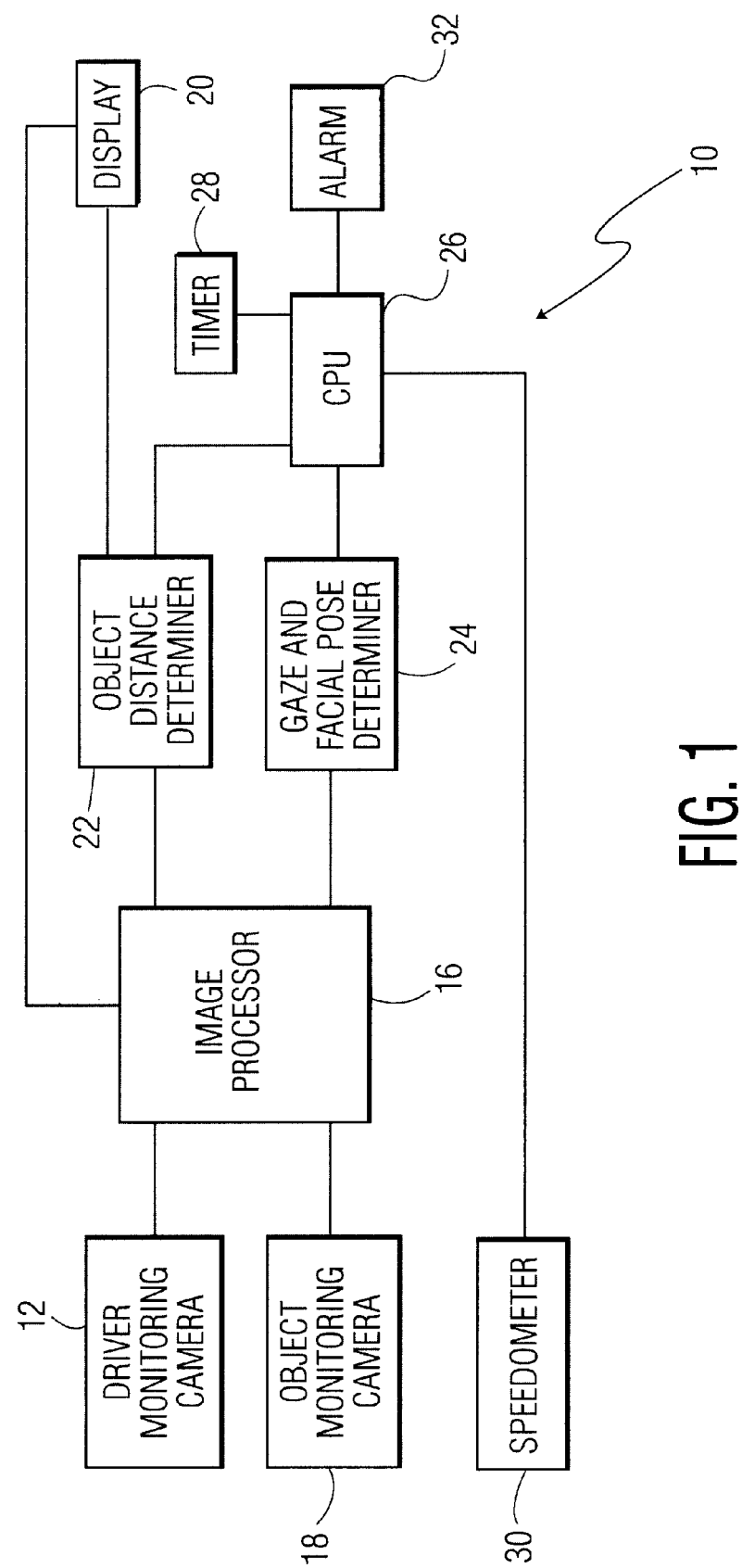
FIG. 1 is a block diagram of the system for monitoring a driver's attention while driving a vehicle according to the present invention.

Referring now to the drawings, the system for monitoring a driver's attention to driving a vehicle 1 is shown. The system preferably includes a driver monitoring camera 12 positioned within the vehicle such that the field of view 12' of the camera has at least a driver's head 14 located therein. The output of the driver monitoring camera 12 is coupled to an image processor 16 which receives image signals from the driver monitoring camera 12 indicative of at least the driver's gaze and facial pose. The gaze of the driver relates to the orientation of the driver's eyes and therefore corresponds to the driver's direction of sight. The facial pose of the driver corresponds to the orientation of the driver's head (i.e., whether the head is turned away from or toward the direction of travel of the vehicle).

The system also includes an object monitoring camera 18 having a field of view 18', disposed so as to monitor at least a forward direction of travel of the vehicle 1. It is foreseen that the object monitoring camera 18 could monitor the areas which are to the side and rear of the vehicle. It is also foreseen that more than one object monitoring camera may be necessary to monitor the areas proximate the vehicle.

The object monitoring camera 18 monitors regions proximate the vehicle and provides image signals in response thereto. The output of the object monitoring camera 18 is coupled to the image processor 16 which receives image signals from the object monitoring camera 18 corresponding to views proximate the vehicle 1 which are in the filed of view 18'. The image processor processes the image signals and provides an output signal to a display 20 for providing the driver with a visual representation of the areas proximate the vehicle 1. A suitable camera for use as the driver monitoring camera 12 and the object monitoring camera 18 is disclosed in U.S. Pat. No. 6,114,951 to Kinoshita et al, the entire disclosure of which is incorporated herein by reference.

Coupled to the image processor 16 is an object distance determiner 22 which determines a relative distance of objects viewed by the object monitoring camera 18 from the vehicle. The object distance determiner 22 provides an output signal to the display 20 which provides the driver with an indication of the distance of each object, located in the object monitoring cameras 18 field of view 18', from the driver's vehicle.

Many systems known to persons skilled in the art can provide the relative distance of an object from a vehicle such as a radar or sonar type system wherein a signal is transmitted to the object and returned to the transmitter for determination of the relative distance, and stereo cameras or a single camera wherein the images acquired from the cameras are analyzed to determine the distance of the object from the vehicle such as that disclosed in U.S. Pat. No. 5,633,705 to Asayama, entitled "Obstacle Detecting System For a Motor Vehicle"; and U.S. Pat. No. 5,304,980 to Maekawa entitled "Distance Detecting Apparatus For A Vehicle"; and U.S. Pat. No. 5,307,136 to Saneyoshi entitled "Distance Detection System For Vehicles", the entire disclosures of which are incorporated herein by reference.

The system also includes a gaze and facial pose determiner 24 coupled to the image processor 16. The gaze and facial pose determiner receives as an input signal image signals generated by the driver monitoring camera 12. The gaze and facial pose determiner analyzes the images captured by the driver monitoring camera and determines the gaze and facial pose of the driver (i.e., whether the gaze and facial pose of the driver are oriented in a forward direction of travel of the vehicle). The gaze and facial pose of the driver are preferably determined in accordance with the teachings in the articles entitled "Gaze Estimation Using Morphable Model" by Thomas D. Rikert and Michael J. Jones, Proceedings of the Third International Conference on Automatic Face and Gesture Recognition, April 14–16, 1998, pages 436-441, and/or "Mixture of Experts for Classification of Gender, Ethnic Origin, and Pose of Human Faces" by Srinivas Gutta, Jeffrey R.J. Huang, P. Jonathon Phillips and Harry Wechsler, in IEEE Transactions on Neural Networks, Vol. 11, No. 4 (July 2000) pages 948–960, the entire disclosures of which are incorporated by reference.

The system also includes a central processing unit (CPU) 26 which receives as input signals an output signal from the gaze and facial pose determiner 24 and an output signal from the object distance determiner 22. Also coupled to the CPU is a timer 28 which is employed to provide an indication of the time that the gaze and facial pose of the driver are not oriented in a forward direction of travel of the vehicle (explained below), and a speedometer 30 which provides an indication of the speed of travel of the vehicle. Coupled to the output of the CPU 26 is an alarm 32 which provides an alarm signal to alert the driver that his gaze and facial pose are not oriented in the forward direction of travel for more than a predetermined period of time (as explained below). The alarm may provide an audible, visual or tactile signal to the driver to advise him to redirect his gaze and facial pose to the forward direction of travel of the vehicle. In the preferred embodiment, the alarm is both audible and visual.

The CPU 26 preferably monitors the input signals provided by the speedometer 30, gaze and facial pose determiner 24, and object distance determiner 22 to advise the driver via the alarm 32 as to whether a dangerous driving condition is developing or is occurring, thereby advising the driver to readjust his attention to the forward driving direction of the vehicle. In the preferred embodiment the CPU 26 actuates the alarm 32 if it is determined that at least one of the gaze and facial pose of the driver are not oriented in the forward direction of travel. Preferably, the CPU monitors the speed of travel of the vehicle and permits the driver to redirect his gaze and facial pose from the forward direction of travel for a brief period of time. The brief period of time is determined by the speed of travel. For example, if the vehicle is traveling at 10 mph, then the driver would be permitted a relatively long period of time (e.g., 2 seconds) to direct his gaze and facial pose from the forward direction of travel, for example, to adjust the stereo or locate his cellular phone to place or receive a call. After the time period has elapsed, the driver would be advised via the alarm to redirect his gaze and facial pose to the forward direction of travel if he has not already done so as the speed of travel increases, the time allotted by the system to permit a driver to direct his gaze and facial pose from the forward direction of travel will decrease. This is because as the speed of the vehicle increases, a greater amount of time is required to stop the vehicle or take other action (steer the vehicle away from an obstruction) in the event of an emergency.

As described above, the CPU 26 also receives from the object distance determiner 22 as an input signal the distance of each object proximate the vehicle. When the CPU determines that at least one of the gaze and facial pose of the driver is not oriented in the forward direction of travel, and the object and distance determiner identifies at least one object in the field of view of the camera and the distance of the at least one object from the vehicle is less that the predetermined distance from the vehicle, the alarm is actuated to warn the driver of a potential danger. The predetermined distance is determined by the speed of the vehicle (e.g., if the driver's vehicle is traveling at 30 mph then a safe following distance is set at 100 ft.).

Figure 2:
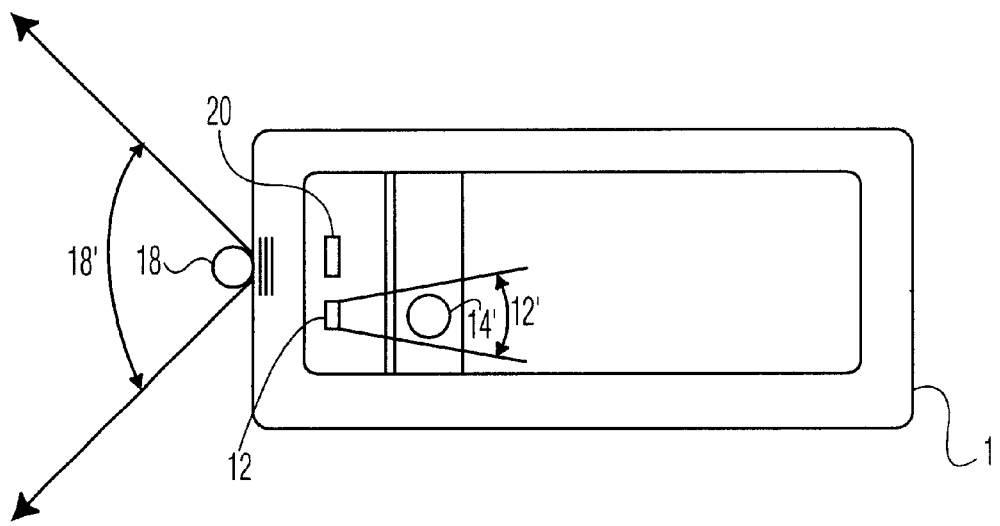
FIG. 2 is a top plan view of a vehicle having the system for monitoring a driver's attention to driving according to the present invention.

Referring now to FIG. 2, the system for monitoring a driver's attention to driving a vehicle is employed on a vehicle, such an automobile, truck, light truck, sport utility, van, bus or motorcycle, is shown. The display 20 is preferably positioned proximate the driver's forward field of view as explained below to provide the driver with an indication of the distance of objects from his vehicle. The driver monitoring camera 12 may be mounted/attached to the dashboard, facia, header or the windshield at a position conventionally occupied by an interior rearview mirror. The camera is preferably of a size and is disposed so as not to interfere with the driver's field of vision.

The display device is preferably of a size so as to be as natural as possible to the driver. This is a function of the size of the displayed image and the distance between the driver and the display. The display is preferably positioned within the driver's physiological field of view, without significantly obstructing the driver's forward vision. The display may be a direct view flat panel display, such as a back-lit or reflective liquid crystal display, a plasma display, a field emission display, a cathode ray tube electroluminescent device, light-emitting diode or deformable mirror display. The image generated by the image processor could also be displayed using other display techniques such as to provide a projected or virtual image. Alternatively, a virtual image may be displayed on an opaque display adjacent the forward field of view, or on a view-through heads-ups display in which the image is superimposed on the driver's forward field of view.

Figure 3:
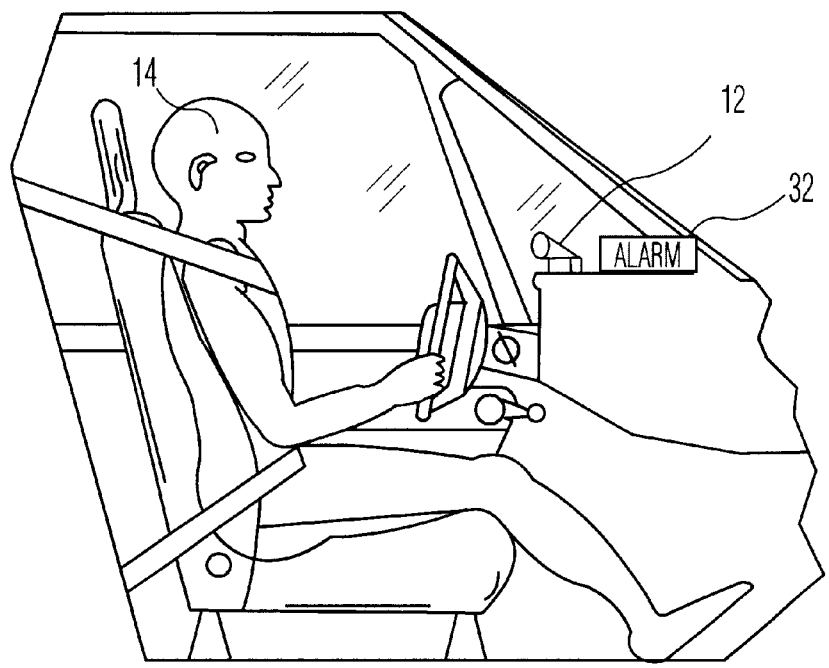
FIG. 3 is a side planar view with parts cut away and removed of a vehicle showing a driver in the passenger compartment including the system for monitoring a driver's attention according to the present invention.

FIG. 3 shows a side planar view of the interior compartment of a vehicle having the driver monitoring camera 12 mounted therein for monitoring a driver's attention to driving according to the present invention.

Although illustrative embodiments of the present invention have been described above in connection with the drawings, it is understood that the invention is not limited to these precise embodiments and that various modifications may be made by persons skilled in the art without departing from the scope and spirit of the invention. For example, it is foreseen that the system could be coupled to the accelerator or vehicular braking system and if the alarm is actuated and the driver's gaze and facial pose are not returned to the forward direction of travel within an additional period of time, the speed of travel of the vehicle will be gradually reduced until the driver redirects his gaze and facial pose to the forward direction of travel. It is also foreseen that if it is determined that the driver's gaze is not directed in the forward direction of travel but the facial pose is, the system may conclude that the driver is dosing and the system will gain the driver's attention by opening a window, providing an audible/text message advising the driver to take a rest from driving, vibrate the steering wheel or seat, and/or turn on the radio or increase its volume if it is already turned on.

What is claimed is:

1. A system for monitoring a driver's attention while driving a vehicle, comprising:
    a driver monitoring camera including a field of view having the driver's face positioned therein so as to view the driver's gaze and facial pose;
    a gaze and facial pose determiner coupled to the driver monitoring camera and receiving image signals from the camera indicative of the driver's face, the gaze and facial pose determiner determining whether the gaze and facial pose of the driver are oriented in a forward direction of travel of the vehicle; and
    an alarm responsive to the gaze and facial pose determiner for advising the driver that at least one of his gaze and facial pose are not oriented in the forward direction of travel of the vehicle.

2. The system as defined by claim 1 further comprising:
    an object monitoring camera having a field of view and being oriented so as to monitor regions external to and proximate the vehicle; and
    an object and distance determiner operatively coupled to the object monitoring camera, the object and distance determiner identifying at least one object which is in the field of view of the object monitoring camera and determining the at least one object's distance from the vehicle.

3. The system as defined by claim 2 wherein the gaze and facial pose determiner determines that at least one of the gaze and facial pose of the driver is not oriented in the forward direction of travel of the vehicle, and the object and distance determiner identifies at least one object in the field of view of the camera and a distance of the at least one object from the vehicle, and it is determined that the distance of the at least one object from the vehicle is less than a predetermined distance from the vehicle, the alarm is actuated to warn the driver of a potential danger and to redirect his gaze and facial pose to the forward direction of travel of the vehicle.

4. The system as defined by claim 2 wherein the object and distance determiner identifies at least one object in the field of view of the camera and a distance of the at least one object from the vehicle, and it is determined that the distance of the at least one object from the vehicle is less than a predetermined distance from the vehicle, the alarm is actuated to warn the driver of a potential danger.

5. The system as defined by claim 2 further comprising:
    a CPU operatively coupled to the gaze and facial pose determiner and the alarm, the CPU monitoring the signals received from the gaze and facial pose determiner and actuating the alarm in response thereto if at least one of the gaze and facial pose of the driver is not oriented in the forward direction of travel of the vehicle.

6. The system as defined by claim 5 further comprising:
    a timer operatively coupled to the CPU for counting a time that the driver's gaze and facial pose are not oriented in the forward direction of travel of the vehicle.

7. The system as defined by claim 2 further comprising:
    a speedometer for measuring a speed of the vehicle; and
    a CPU operatively coupled to the gaze and facial pose determiner, the speedometer and the alarm, the CPU receiving an input signal from the speedometer indicative of the speed of the vehicle, the CPU monitoring the signals received from the gaze and facial pose determiner based on the speed of the vehicle,
    wherein if the CPU determines that at least one of the gaze and facial pose of the driver is not oriented in the forward direction of travel of the vehicle for a predetermined period of time, the predetermined period of time corresponding to the speed of the vehicle, the CPU actuates the alarm to advise the driver to redirect his gaze and facial pose in the forward direction of travel of the vehicle.

8. The system as defined by claim 7 further comprising:
    a timer operatively coupled to the CPU for counting a time that the driver's gaze and facial pose are not oriented in the forward direction of travel of the vehicle.

9. The system as defined by claim 1 further comprising:
    a speedometer for measuring a speed of the vehicle,
    wherein if the gaze and facial pose determiner determines that at least one of the gaze and facial pose of the driver is not oriented in the forward direction of travel of the vehicle for a predetermined period of time, the alarm is actuated to advise the driver to set his gaze and facial pose in the forward direction of travel.

10. The system as defined by claim 9 wherein the predetermined period of time is determined by the speed of the vehicle.

11. The system as defined by claim 1 wherein the alarm is one of an audible alarm, visual alarm or tactile alarm.

12. A system for monitoring a driver's attention while driving a vehicle, comprising:
    a driver monitoring camera including a field of view having the driver's face positioned therein so as to monitor the driver's gaze and facial pose;

a gaze and facial pose determiner coupled to the driver monitoring camera and receiving image signals from the driver monitoring camera indicative of the driver's face, the gaze and facial pose determiner determining whether the gaze and facial pose of the driver are oriented in a forward direction of travel of the vehicle;

an object monitoring camera having a field of view and being oriented so as to monitor regions external to and proximate the vehicle;

an object and distance determiner operatively coupled to the object monitoring camera, the object and distance determiner identifying an object which is in the field of view of the object monitoring camera and its distance from the vehicle; and a speedometer for determining a speed of the vehicle;

wherein if it is determined that at least one of the gaze and facial pose of the driver are not oriented in the forward direction of travel of the vehicle, and the object and distance identifier identifies an object in the field of view of the camera that is within a predetermined distance from the vehicle, the alarm is activated to advise the driver to redirect his gaze and facial pose to the forward direction of travel of the vehicle; and wherein if it is determined that at least one of the gaze and facial pose of the driver are not oriented in the forward direction of travel of the vehicle for a predetermined period of time, the alarm is activated to advise the driver to redirect his gaze and facial pose on the forward direction of travel of the vehicle.

13. The system is defined by claim 12 wherein the predetermined period of time is determined by the speed of the vehicle.

14. The system as defined by claim 12 further comprising:

a CPU operatively coupled to the gaze and facial pose determiner and the alarm, the CPU monitoring the signals received from the gaze and facial pose determiner and actuating the alarm in response thereto if at least one of the gaze and facial pose of the driver is not oriented in the forward direction of travel of the vehicle.

15. The system as defined by claim 12 further comprising:

a timer for counting a time that the driver's gaze and facial pose are not oriented in the forward direction of travel of the vehicle.

* * * * *